3,555,076
PROCESS FOR THE PRODUCTION OF CYANAMIDE DICARBOXYLIC ACID ESTERS

Wilhelm Thoma, Cologne, and Otto Bayer, Burscheid, Germany, assignors to Farbenfabriken Bayer Aktiengesellschaft, Leverkusen, Germany, a corporation of Germany
No Drawing. Filed June 21, 1966, Ser. No. 559,117
Claims priority, application Germany, Aug. 31, 1965, F 47,047
Int. Cl. C07c *125/08*
U.S. Cl. 260—479        10 Claims

ABSTRACT OF THE DISCLOSURE

Cyanamide dicarboxylates and a process for their production, the resulting product having utility as a plant protection agent or preservative.

---

The production of cyanamide-dicarboxylic acid methyl or ethyl esters is known. These compounds are obtained in low yield by reacting completely dry sodium cyanamide or pure calcium cyanamide in absolute ether with methyl or ethyl chloroformates, a large amount of cyanamide, dichnadiamide and cyanurethane being also produced. (Baessler, Joürnal fur praktische Chemie (2), vol. 16 (pages 125–135 (1877)) and (Pink, Blair Journal of the American Chemical Society, vol. 49, page 551 (1927)).

The reaction of pure cyanamide with methyl or ethyl chloroformate and sodium hydroxide solution as in the Schotten-Baumann reaction gives the esters in yields of 22 to 53%, respectively, of the theoretical (Diels, Gollmann, Bericht der Deutschen Chemischen Gesellschaft 44, page 3160 (1911)).

These known methods for the production of cyanamide dicarboxylic acid esters of lower alcohols suffer from the disadvantages of low yields and the necessity of using completely dry reactants or even pure calcium cyanamide or free cyanamide when the reaction is carried out in the aqueous phase.

It has now suprisingly been found that cyanamide dicarboxylic acid esters may be obtained in a simple manner and in excellent yields if alkali metal or alkaline earth metal salts of cyanamide are reacted with chloroformates of the general formula

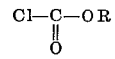

in which R represents an aliphatic, cycloaliphatic, araliphatic, aromatic or heterocyclic radical which radical may be substituted in the presence of about 0.1 to about 10% by weight (based on chloroformate) of a tertiary organic base and in the presence of a two-phase, aqueous-organic reaction medium, in the temperature range from —10 to +80° C., to form compounds of the general formula

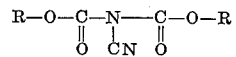

in which R has the meaning indicated above.

Preferred aliphatic radicals are those with 1 to 20 carbon atoms, which can also contain olefinic double bonds or triple bonds, which may be substituted once or a number of times by halogen (advantageously fluorine, chlorine or bromine), alkoxy (advantageously with 1 to 20 carbon atoms) or by CN. The term "cycloaliphatic radical" includes as preferred radicals 5-membered, 6-membered and 12-membered radicals, which may be substituted once or a number of times by an alkyl radical (advantageously with 1 to 12 carbon atoms).

Preferred araliphatic radicals are the benzyl or the menaphthyl radical, which may be substituted once or a number of times by halogen (advantageously fluorine, chlorine or bromine) nitro, alkoxy (advantageously with 1 to 8 carbon atoms) or by CN.

Preferred aromatic radicals are mononuclear or dinuclear radicals with up to 10 carbon atoms in the ring system, in which two of such aromatic ring systems may be connected to one another by an oxygen or sulphur atom or an $SO_2$ group; the aromatic radical may also be substituted once or a number of times by an alkyl radical (advantageously with 1 to 12 carbon atoms), an alkoxy radical (advantageously with 1 to 8 carbon atoms), a halogen atom (advantageously fluorine, chlorine or bromine) or a nitro, CN or carbaloxy group (advantageously with 1 to 4 carbon atoms). Examples of aromatic radicals include the phenyl, naphthyl, diphenyl, diphenyl oxide, 2,2'-dinaphthyl sulphide or diphenyl sulphone radicals.

By heterocyclic radicals, there are to be understood 5-membered or 6-membered heterocyclic compounds which may be substituted by lower alkyl groups (with 1 to 4 carbon atoms), which compounds contain 1 or 2 oxygen atoms as a sole heteroatom(s). The following radicals are mentioned by way of example:

Furfuryl, tetrahydro furfuryl, dibenzofuryl - (3), 4 - methyl - cumaryl(7), 2,2' - dimethyl - 1,3 - dioxolanyl-(4), and the O-heterocyclic radical of the formula:

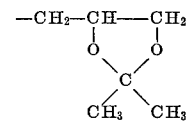

Examples of chloroformates which may be used in the process of the invention are the following: methyl, ethyl, n-propyl, isopropyl, propargyl, allyl, n-butyl, isobutyl, stearyl, β-chloro and β-bromethyl, β-methoxyethyl, β-ethoxyethyl, cyclohexyl, 4-tert.octylcyclohexyl-, benzyl, 3,4-dichlorobenzyl, phenyl, cresyl, xylenyl, 4-chlorphenyl, 2,4-dichlorophenyl, 3-methyl-4-chlorophenyl α(or β)-naphthyl, 4-diphenyl, 4-carbomethoxyphenyl, 4-methoxyphenyl, 3-nitrophenyl or tetrahydrofurfuryl chloroformates.

It is also possible to use chloroformates of the following alcohols: iso-amylalcohol, sec. butanol, 1 - hexanol, 2-ethyl - 1 butanol, 2,2 - dimethyl - 1 - butanol, 2,2 - dimethyl - 1 - hexanol, 1 - octanol, 2 - ethyl - 1 - hexanol, 3,5,5 - trimethyl - 1 - hexanol, 1 - decanol, 2,2 - dimethyl - 1 - decanol, cetyl alcohol, 2 - fluoroethyl alcohol, 2,2,2 - trichlorethyl alcohol, 2 - cyanethyl alcohol, 3 - chloropropyl alcohol, octadec - 9 - en - 1 - ol,, n - propoxyethyl alcohol, i - propoxyethyl alcohol, n - butoxyethyl alcohol, 2 - methylcyclohexanol, 3 - methylcyclohexanol, 4 - methyl - cyclohexanol, menthol borneol, cyclododecanol, phenoxyethyl alcohol, phenoxypropyl alcohol, 2 - chlorophenol, 3 - chlorophenol, 2,6-dichlorophenol, 5 - chloro - 2 - nitrophenol, 4,6 - dichloro - 2-nitrophenol, 3 - chloro - 4 - nitropenol, 2 - methyl - 4 - chlorophenol, trichlorcresol, 3 - methyl - 6 - nitrophenol, 4 - nitrobenzyl alcohol, 2 - ethylphenol, triethylphenol, isoproplyphenol, 2 - phenylethyl alcohol, 2 - tert.-butylphenol, 4 - tert.-butylphenol and cinnamic alcohol.

The alkali metal or alkaline earth metal salts of cyanamide can be used as reactants for the esters referred to above; it is preferred to use sodium or calcium cyanamide, which can be obtained satisfactorily on an industrial scale.

Catalysts which are used for the process according to the invention include for example the following tertiary organic bases, which are used in quantities of about 0.1 to about 10% by weight, based on chloroformate: tri-n-propylamine, triisopropylamine, tri-n-butylamine, triisobutylamine, N-dimethyl-cyclohexylamine, N-diethylcyclohexylamine, N-dimethyl-benzylamine, N-diethylbenzylamine, di-n-propylmethyl amine, N-dimethylethylphenylamine, N,N'-tetramethyl butylene diamine, ethoxylated N-methylstearylamine, N-dimethylamine, pyridine, quinoline, alkyl pyridines, N-methylmorpholine and diazabicyclooctane; one may also use amines which contain, as well as the tertiary amino group carbamic ester, urea, amide or ester groups, e.g., N-methylamino-bis-(propane-3-carbamic acid methyl or ethyl ester), phenyl carbamic acid esters of N-methyl diethanolamine or triethanolamine, N-methylamino-bis-(propylene-N',N''-stearyl urea), N-methylamino - bis - (propane-3-acetamide), N-methylamino-bis-(propane-3-benzamide) and acetates or propionates of N-methyl diethanolamine or N-ethylpropanolamine.

Examples of solvents which are immiscible with water include the following: chloroform, methylene chloride, carbon tetrachloride, trichlorethylene, petroleum fractions with boiling ranges between 40 and 180° C., benzene, toluene, chlorobenzene, diethyl ether and ethyl acetate. The ratio by volume between the water and the organic solvent should be about 1:0.1 to about 1:3.

For carrying out the process according to the invention, water, the solvent immiscible with water and, as catalyst, the tertiary organic base, are first supplied to the reaction and sodium or calcium cyanamide and chloroformates in the approximate molar ratio of 1:2 are introduced while stirring at a temperature from about −10 to about +80° C., advantageously 0 to 30° C., over a period of 10 to 300 minutes and advantageously 30 to 60 minutes. After completing the introduction, the reaction is brought to an end in 30 to 150 minutes and then the two phases are separated; the organic phase is washed with water and dried. After distilling off the organic solvent, the crude cyanamide dicarboxylate is left and this is generally already of a high degree of purity. The reaction can also be so carried out by introducing the chloroformate into the sodium or calcium cyanamide in the aqueous-organic reaction medium with the catalyst already present.

In another embodiment of the process, the chloroformate and the catalyst are first supplied to the two-phase reaction system and the cyanamide salt is introduced. In yet another embodiment of the process the sodium or calcium cyanamide is first supplied to the reaction in the aqueous organic reaction medium and the chloroformate and the tertiary organic base, dissolved in a solvent which is immiscible with water, are added dropwise. In one particularly favourable way of carrying out the process the chloroformate is first supplied to the reaction in aqueous organic medium, the dissolved catalyst is added and the cyanamide salts are then introduced. The process can also be carried out continuously. The aqueous solution or suspension of the cyanamide salts is in this case thoroughly mixed in a reaction chamber with the stream of the chloroformate, if desired disolved in an organic solvent which is immiscible with water, and with the stream of the catalyst solution. The reaction mixture is continuously discharged. The phases are separated in a settling vessel and are drawn off using siphons. After the continuous washing of the organic solution with water and drying, for example in a tower filled with a drying agent, the cyanamide dicarboxylate is isolated by distilling off the solvent.

The process according to the invention gives cyanamide dicarboxylates with high yields. It enables the reaction to be carried out in the presence of water and in particular permits the use of commercially available salts of cyanamide, such as sodium or calcium cyanamide.

The cyanamide dicarboxylates which can be prepared by the process can for example be used as plant protection agents or wood preservatives.

The efficiency of the compounds against mould fungi and yeasts can be seen from the following data, according to which for example the phenyl cyanamide dicarboxylate, in a concentration of 0.07% (based on substrate) prevents the growth of *Penicillium glaucum* and *Aspergillus niger* and, in a concentration of 0.02 to 0.03%, is effective against *Saccharomyces cerevisiae*. The other compounds which are obtainable by the process also show a similar action.

EXAMPLE 1

95 g. of methyl chloroformate are dissolved in 300 ml. of chloroform. 2 ml. of N-methylamino γ,γ'diaminopropane are added as catalyst, which substance reacts immediately with the methyl chloroformate to give N-methylamin-bis-(propane-3-carbamic acid methyl ester). After adding 300 ml. of water, the two-phase reaction mixture is cooled to 10–15° C., and, in about 10 minutes 43 g. of crushed solid sodium cyanamide of commercial grade are introduced (nitrogen content of the cyanamide corresponds to an 89% product). After adding the sodium cyanamide, stirring is carried out for 60 minutes at 20° C., the two phases are separated, the chloroform solution is washed with water, dried over sodium sulphate and the solvent is then distilled off in vacuo. 56 g. (=80.0% of the theoretical) of methyl cyanamide dicarboxylate are obtained with a melting point of 101° C. without previous purification. If the experiment is repeated without adding a catalyst, the yield is below 20% of the theoretical.

Instead of the chloroform, one may use the same volume of toluene, benzene, methylene chloride or ethyl acetate. If, instead of the N-methylamino-bis-(propane-3-carbamic acid methyl ester), there is used 1.0 ml. of one of the following compounds, that is N-dimethylcyclohexylamine, N-dimethylbenzylamine, N-dimethylaniline, triethylamine, pyridine, N-methylmorpholine, oxethylated N-methylstearylamine (about 10 oxyethyl groups) or 1.0 g. of diazabicyclooctane the methyl cyanamide dicarboxylate is obtained with an equally good yield.

EXAMPLE 2

110 g. of ethyl chloroformate, 350 ml. of chloroform and 300 ml. of water are cooled to 10° C. A solution of 1.0 ml. of N-dimethyl cyclohexylamine in 100 ml. of chloroform is added dropwise with stirring and simultaneously 43 g. of commercial grade sodium cyanamide in powder form are introduced.

After stirring for another 60 minutes at 20° C., the phases are separated, the chloroform solution is washed with water, then dried with sodium sulphate and the solvent is distilled off in vacuo. 79 g. (94.5% of the theoretical) of a colourless oil are obtained; this oil crystallises on cooling with ice and the solid has a melting point of 30° C.

EXAMPLE 3

160 g. of phenyl chloroformate, 400 ml. of methylene chloride and 300 ml. of water are cooled to 0° C. A solution of 1.0 ml. of N-dimethyl cyclohexylamine in 100 ml. of methylene chloride is added dropwise over 10 minutes and simultaneously 43 g. of technical sodium cyanamide are introduced. The precipitate forming after stirring for 60 minutes at 20° C. is filtered off with suction and washed with water. 18 g. of phenyl cyanamide dicarboxylate are obtained at this stage.

The methylene chloride phase is separated, washed with water and dried. After distilling off the methylene chloride, there remains a solid residue of 97 g. of phenyl cyanamide dicarboxylate. In the crude state, the product has a melting point of 130–132° C., which rises to 134–135° C. upon recrystallisation from benzene. Yield: 92% of the theoretical. $C_{15}H_{10}N_2O_4$ (molecular weight 282.3). Calculated: C, 63.82%; H, 3.57%; N, 9.92%; O, 22.67%. Found: C, 63.79%; H, 3.60%; N, 10.26%; O, 22.62%.

EXAMPLE 4

205 g. of 3 - methyl - 4 - chlorophenyl chloroformate (99.5%) are dissolved in 500 ml. of trichlorethylene. 350 ml. of water are added, the two-phase system is cooled to 10° C. and a solution of 1.0 ml. of dimethyl cyclohexylamine in 100 ml. of benzene is added dropwise over 15 minutes. At the same time, 47 g. of powdered commercial grade sodium cyanamide are added with brisk stirring. After stirring for 60 minutes at 30° C., the phases are separated, the organic solution is washed with water, dried over calcium chloride and the solvent mixture is distilled off. 120.5 g. (64% of the theoretical) of 3-methyl-4-chlorophenyl cyanamide dicarboxylate are obtained after recrystallisation from benzene. M.P.: 112–115° C.

EXAMPLE 5

240 g. of 3,4-dichlorobenzyl chloroformate (98.5%) are dissolved in 400 ml. of light petroleum. After adding 300 ml. of water, a solution of 1.0 ml. of N-dimethyl cyclohexylamine in 100 ml. of light petroleum is added dropwise in 30 minutes while stirring vigorously and at 25° C. At the same time, 43 g. of powdered commercial grade sodium cyanamide are introduced. After further stirring at room temperature (1 hour), the phases are separated, the petroleum solution is washed with water and dried over calcium chloride. After distilling off the petroleum, there are obtained 190 g. (95% of the theoretical) of 3,4-dichlorobenzyl cyanamide dicarboxylate. M.P.: 86–87° C.

EXAMPLE 6

31 g. of allyl chloroformate are dissolved in 300 ml. of benzene. After adding 300 ml. of water, a solution of 1.0 ml. of N-dimethyl cyclohexylamine in 100 ml. of benzene is introduced dropwise in 10 minutes while stirring well and simultaneously 43 g. of powdered commercial grade sodium cyanamide are introduced. After a reaction lasting 2 hours, the phases are separated, the benzene solution is washed with water, the solution is dried over calcium chloride and the benzene is distilled off. 88 g. (93% of the theoretical) of allyl cyanamide dicarboxylate are obtained in liquid form; on cooling with ice, the ester crystallises and then melts at about 15° C.

EXAMPLE 7

200 g. of 95% cyclohexyl chloroformate are dissolved in 400 ml. of chloroform and covered with 150 ml. of water. At 35° C., a solution of 1.0 ml. of N-dimethyl cyclohexylamine in 100 ml. of chloroform and a solution of 55 g. of commercial grade sodium cyanamide in 500 ml. of water are simultaneously introduced in about 10 minutes. After a reaction lasting half an hour at 35° C., the phases are separated. The cyclohexyl cyanamide dicarboxylate is isolated, as described in the previous examples. Yield: 154 g. (90% of the theoretical), $n_D^{20}=1.4728$.

EXAMPLE 8

160 g. of phenyl chloroformate, 400 ml. of chloroform and 300 ml. of water are first supplied at 10° C. to the reaction. A solution of 1.0 ml. of N,N-dimethyl cyclohexylamine in 100 ml. of chloroform is added dropwise over 30 minutes and simultaneously 80 g. of commercial grade calcium cyanamide ("lime nitrogen") are introduced. After 1½ hours, the reaction mixture is filtered, the phases are separated, the chloroform solution is dried with calcium chloride and finally the chloroform is distilled off. 103 g. (73% of the theoretical) of completely white phenyl cyanamide dicarboxylate are obtained. M.P.: 128° C.

EXAMPLE 9

300 ml. of chloroform, 300 ml. of water, 1.0 ml. of dimethylbenzylamine and 43 g. of sodium cyanamide are first supplied to the reaction at 10° C. and, in about 30 minutes, a solution of 165 g. of tetrahydrofurfuryl chloroformate (93.2%) in 100 ml. of chloroform is added dropwise. After adding the chloroformate solution, the reaction mixture is stirred for another 60 minutes at 20° C., the phases are separated, the chloroform solution is washed with water, dried over sodium sulphate and the solvent is distilled off in vacuo. 113 g. (83.5% of the theoretical) of tetrahydrofurfuryl cyanamide dicarboxylate are obtained. $n_D^{20}=1.4793$. The oily substance does not crystallise, even after standing for a relatively long time at 0° C.

EXAMPLE 10

300 ml. of chloroform, 300 ml. of water and 43 g. of sodium cyanamide are first supplied to the reaction at 10° C. and 370 g. of a 39.2% solution of β-chlorethyl chloroformate in toluene and a solution of 1.0 ml. of N,N-dimethylaniline in 100 ml. of chloroform are simultaneously added dropwise in about 20 minutes. After the reaction period of 1 hour at 20° C., working up is carried out in accordance with the method described in the previous examples. 98 g. (93.5% of the theoretical) of β-chlorethyl cyanamide dicarboxylate are obtained. The product which initially is oily crystallises on being kept in a refrigerator. M.P.: 61–62° C.

EXAMPLE 11

300 ml. of chloroform, 300 ml. of water and 1.0 ml. of pyridine are supplied to the reaction at 10° C. 43 g. of a solid sodium cyanamide are introduced in portions and a solution of 140 g. of β-methoxyethyl chloroformate (97.5%) in 100 ml. of chloroform is added dropwise at the same time. After stirring well for 1 hour at 20° C., the reaction mixture is worked up in the manner described in the previous examples. 82 g. (75% of the theoretical) of an oil are obtained, this oil crystallising quickly on cooling to 0° C. The β-methoxyethyl cyanamide dicarboxylate melts at 40–41° C.

*Analysis.*—Calc'd for $C_9H_{14}N_2O_6$ (molecular weight 246.2) (percent): N, 11.38; O, 39.00. Found (percent): N, 11.04; O, 39.15.

EXAMPLE 12

166 g. of benzyl chloroformate are dissolved in 300 ml. of chloroform and this solution is covered with 300 ml. of water. A solution of 1.0 ml. of N-dimethylcyclohexylamine in 100 ml. of chloroform is added dropwise at 10° C. with vigorous stirring and simultaneously 41.7 g. of powdered commercial grade sodium cyanamide are introduced. The dropwise addition takes about 20 minutes. On completing the addition, the reaction mixture is stirred for another 60 minutes at 20° C. In order to separate out the benzyl cyanamide dicarboxylate, the two phases are separated, the organic phase is washed with water and dried. After distilling off the solvent, 129 g. (95.5% of the theoretical) of benzyl cyanamide dicarboxylate are obtained. M.P.: 68 to 70° C.

*Analysis.*—Calc'd for $C_{17}H_{14}N_2O_4$ (molecular weight 310.3) (percent): C, 65.80; H, 4.55; O, 20.62. Found (percent): C, 65.86; H, 5.07; O, 20.34.

EXAMPLE 13

137 g. of n-butyl chloroformate are dissolved in 300 ml. of chloroform. After adding 300 ml. of water, 1.0 ml. of n-dimethylcyclohexylamine in 100 ml. of chloroform are added dropwise in 15 minutes while stirring and simultaneously 43.0 g. of commercial grade sodium cyanamide are introduced. After stirring for 1 hour at 20° C., working up is carried out as in Example 12. 928 g. (=90% of the theoretical) of N-butyl cyanamide dicarboxylate (in liquid form) are obtained;

$$n_D^{20}=1.4396$$

*Analysis.*—Calc'd for $C_{11}H_{18}N_2O_4$ (molecular weight 242.3) (percent): C, 54.53; H, 7.49; O, 26.41. Found (percent): C, 54.68; H, 7.76; O, 26.48.

What is claimed is:
1. A cyanamide dicarboxylate of the formula

$$\underset{\underset{O}{\|}\phantom{-N-}\underset{O}{\|}}{R-O-C-N-C-O-R}\overset{CN}{|}$$

wherein R is haloalkyl containing 1 to 20 carbon atoms, phenyl, halophenyl, alkyl substituted phenyl wherein the alkyl moiety contains 1 to 12 carbon atoms, 3-methyl-4-chlorophenyl, benzyl or 3,4-dichlorobenzyl.

2. The compound of claim 1 wherein R is haloalkyl containing 1 to 20 carbon atoms.

3. The compound of claim 2 wherein R is 2-chloroethyl.

4. The compound of claim 2 wherein R is 3-chloropropyl.

5. The compound of claim 1 wherein R is phenyl.

6. The compound of claim 1 wherein R is 3-methyl-4-chlorophenyl.

7. The compound of claim 1 wherein R is benzyl.

8. A process for producing cyanamide dicarboxylates of the formula $$\underset{\underset{O}{\|}\phantom{-N-}\underset{O}{\|}}{R-O-C-N-C-O-R}\overset{CN}{|}$$

which comprises reacting an alkali metal or alkaline earth metal salt of cyanamide with a chloroformate of the formula $$\underset{\underset{O}{\|}}{Cl-C-OR}$$

wherein R is haloalkyl containing 1 to 20 carbon atoms, phenyl, halophenyl, alkyl substituted phenyl wherein the alkyl moiety contains 1 to 12 carbon atoms, 3-methyl-4-chlorophenyl, benzyl or 3,4 - dichlorobenzyl in the presence of a catalytic amount of N-methylamino-γ,γ'-diaminopropane, N,N-dimethylcyclohexylamine, N,N-dimethylbenzylamine or N,N-dimethylaniline and in the presence of a two phase, aqueous organic reaction medium at a temperature of about −10 to 80° C. and recovering resulting dicarboxylate of said formula.

9. The process of claim 8 wherein the ratio of water to organic solvent in said two phase reaction medium is 1:0.1 to 1:13.

10. The process of claim 8 wherein said cyanamide is sodium cyanamide or calcium cyanamide.

References Cited

UNITED STATES PATENTS

| 2,541,646 | 2/1951 | Gleim | 260—482X |
| 2,568,608 | 9/1951 | Bralley | 260—77.5 |
| 2,249,134 | 7/1941 | Hechenbleikner | 260—482 |

FOREIGN PATENTS

| 247,453 | 8/1911 | Germany | 260—482 |

OTHER REFERENCES

Gleim II: J. Am. Chem. Soc., vol. 76, pp. 107–111 (1954).

Kaiser et al.: J. Org. Chem., vol. 17, pp. 185–192 (1952).

Ercoli: Chemical Abstracts, vol. 30, 1028 (1936).

LORRAINE A. WEINBERGER, Primary Examiner

P. J. KILLOS, Assistant Examiner

U.S. Cl. X.R.

260—340.9, 343.2, 347.4, 482; 424—300